INVENTOR.
MALCOLM W. MILES

United States Patent Office 3,122,739
Patented Feb. 25, 1964

3,122,739
MOVEMENT DETECTOR
Malcolm W. Miles, San Diego, Calif., assignor to Spasors, Incorporated, San Diego, Calif., a corporation of California
Filed Mar. 23, 1962, Ser. No. 182,036
4 Claims. (Cl. 343—7.7)

This invention relates to a movement detector and more particularly to a movement detector utilizing coherent carrier phase comparison techniques.

According to the invention, the output of a CW transmitter is coupled to a radiating antenna for continuous wave transmission. A small portion of the transmitter output is coupled to a mixer of the heterodyne type. Reflected energy entering the antenna is also coupled to the mixer resulting in no output if the frequency of the reflected signal is the same as that of the transmitted signal, i.e., if the phase of the reflected signal is not changing with respect to the phase of the transmitted signal. If the frequency is changed as a consequence of the fact that the phase is changing, the mixer will yield an output which will be the beat or difference frequency of the two input signals to the mixer. This difference signal is then converted to a D.C. potential whose amplitude is directly proportional to the difference frequency.

If it is desired that the output signal have direction sense, i.e., a determination of the direction of frequency change as a result of a continuing phase shift, a phase shifter can be placed in the transmission line leading from the transmitter to the antenna for shifting linearly the phase of the transmitted signal from zero to 360 degrees at a known specified rate resulting in a frequency change at the rate of shift which can be utilized as a quiescent condition, i.e., an artificial continuous phase shift resulting in a fixed frequency difference is introduced into the system from which a received signal continuous phase shift will add or subtract resulting in an output reading increasing or decreasing depending on direction of changing phase or frequency shift.

In either case the output D.C. potential can be metered or indicated in any desired manner, e.g., calibrated directly in speed or velocity of movement, or merely indicating movement, if any, by an alarm.

It is thus an object of the present invention to provide a movement detector which is capable of indicating speed of movement.

Another object of the present invention is provision of a movement detector which is capable of indicating velocity of movement.

A further object of the present invention is to provide a movement detector which is extremely simple in operation.

Yet another object of the present invention is the provision of a movement detector requiring a minimum of calibration and maintenance.

A still further object of the present invention is the provision of an improved movement detector which is simple, inexpensive and requires very little maintenance.

Other objects and many of the attendant advantages of this invention will be readily appreciated as the same becomes better understood with reference to the following detailed description when considered in connection with the accompanying drawings in which like reference numerals designate like parts throughout the figures thereof and wherein.

Figure 1:
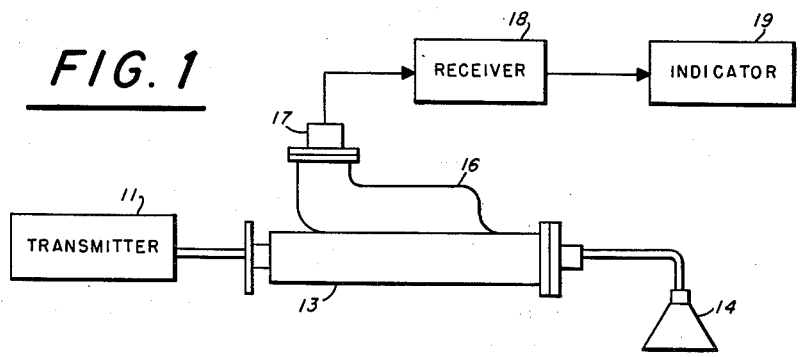
FIG. 1 illustrates a simplified block diagram of one embodiment of the present invention.

Referring to FIG. 1, there is shown transmitter 11 coupled to transmission line 13 which in turn is coupled to radiating horn 14, duplexer 16, and mixer 17. Mixer 17 is coupled to receiver 18 which in turn is connected to indicator 19.

Figure 2:
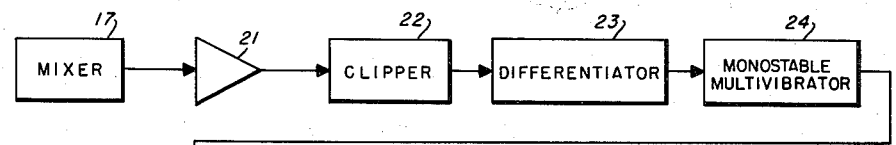
FIG. 2 is a more detailed block of the receiver of FIG. 1.

Referring to FIG. 2, mixer 17 is connected to amplifier 21 which in turn is coupled to clipper 22. The output of clipper 22 is connected to differentiator 23, the output of which is connected to monostable multivibrator 24. The output of monostable multivibrator 24 is connected to detector 26 which is coupled to integrator 27, the output of which is connected to indicator 19.

Figure 3:
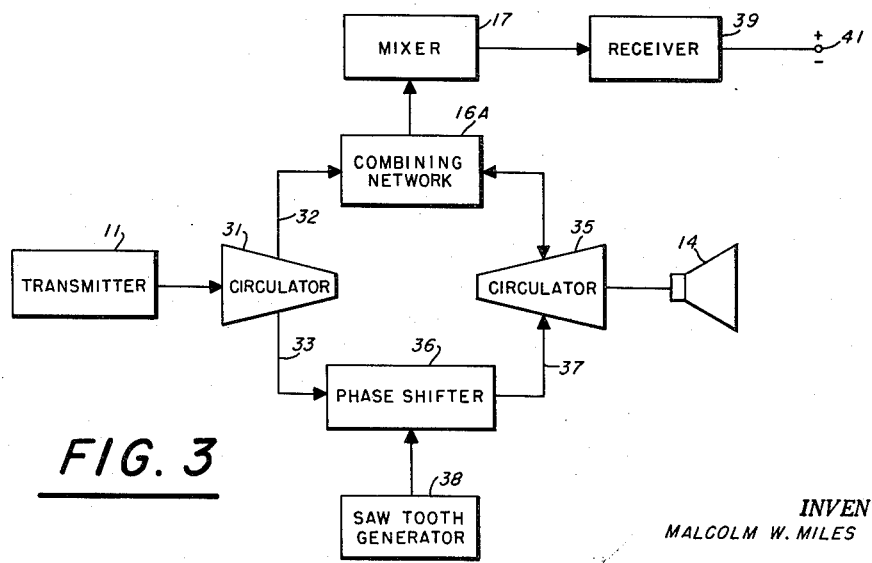
FIG. 3 illustrates a basic block diagram of a second embodiment of the present invention.

Referring to FIG. 3, transmitter 11 is coupled to circulator 31, which in turn is coupled to transmission lines 32 and 33. Transmission line 32 is coupled to combining network 16A which is also coupled from a circulator 35 to radiating horn 14. Transmission line 33 is coupled to a phase shifter 36. Phase shifter 36 is coupled to transmission line 37 which, in turn, is connected to radiator horn 14 through the circulator 35. Sawtooth generator 38 is connected to phase shifter 31. The output of combining network 16A is connected to a mixer 17, the output of which is connected to a receiver 39. The output of receiver 18 appears at terminal 41.

Operation

Since the instant invention is a movement detector, i.e., a device for indicating movement relative to itself and means are provided for producing a voltage indicative of both speed of movement in a given plane and direction of movement or velocity in a given line, its uses and applications are far too numerous to outline. Hence, the following explanation will be given with reference to the invention being used as an altitude rate measuring system or vertical speed or direction indicator. It is to be understood that the invention is not limited to such an application.

Referring back to FIG. 1, transmitter 11 can be any CW transmitter such as an X-band reflex klystron, for example. The output of transmitter 11 is coupled to wave guide 13 and in turn to radiating horn 14 which will be radiating energy toward the earth. A small portion of the output of transmitter 11 is also coupled through duplexer 16 to mixer 17, which, in this embodiment, can be a conventional crystal mixer. Any reflected signal will then be picked up by horn 14 and also coupled through duplexer 16 to mixer 17. If the return signal is the same frequency as the output of transmitter 11, hence of constant phase relationship to the output of transmitter 11, there will be no output from crystal 17. However, should the aircraft be ascending or descending, the phase of the signal arriving at horn 14 will be changing, which will result in an amplitude modulated resultant in mixer 17. The detected output of mixer 17 will then be the modulation envelope of this mixer input resultant signal. The frequency of the modulation envelope will be dependent upon the rate of phase change of the signal arriving at horn 14 which, in turn, is dependent upon the speed of ascent or descent. The signal is then processed in receiver 18 which converts this envelope frequency into a D.C. potential having an amplitude proportional to the frequency of the modulation envelope. Indicator 19 then indicates the amplitude of this D.C. potential which can be directly calibrated, for example, in vertical speed.

The receiver 18 of FIG. 1 is shown in more detail in FIG. 2. The output of mixer 17 is amplified in amplifier 21, clipped by clipper 22 and differentiated by differentiator 23. The output of differentiator 23 will then be sharp pulses at the frequency of the envelope coming from mixer 17. These pulses are then utilized to trigger monostable multivibrator 24 which is asymmetrical, the output being detected by detector 26 and integrated by integrator 27, resulting in a D.C. voltage directly proportional to the frequency of the signal at the output of mixer 17. Indicator 28 can be a D.C. meter, cathode ray tube, recorder, etc. Monostable multivibrator 24 can also be a triggered blocking oscillator or any other convenient or conventional form of pulse generator. It is pointed out that one of the major advantages of this system lies in its simplicity. For example, the transmitter is utilized as the local oscillator which minimizes requirements for frequency precision, i.e., should the transmitter drift, the local oscillator also drifts, resulting in no frequency or phase distortion, or tuning problems.

Referring to FIG. 3, a further refinement of the system of FIG. 1 is illustrated. The general theory is the same with the exception of the RF transmission line system. Circulators 31 and 35 are conventional coupling devices which couple almost all of the energy coming in one branch to one of the two remaining lines, and very little energy to the other remaining line. Thus, most of the output from transmitter 11 is coupled to circulator 31 which in turn passes energy to phase shifter 36 via transmission line 33. Circulator 35 couples energy from phase shifter 36 to horn 14. Circulator 31 also couples a small amount of energy from transmitter 11 to combining network 16A and crystal mixer 17, the output of which is coupled to receiver 39 and output terminal 41. In the same manner, circulator 35 couples almost all of the energy from horn 14 to combining network 16A. Combining network 16A is merely an adding network for presenting the two signals at its inputs to mixer 17.

The output of sawtooth generator 38 is coupled to phase shifter 36 in order to provide a phase shift for the transmitted signal. Phase shifter 36 is preferably a ferrite phase shifter, the amount of shift depending upon the magnitude of D.C. current being fed into its related coil (not shown). This current is shown as coming from sawtooth generator 38. It can be seen that if the output of sawtooth generator 38 starts at zero and linearly rises to a maximum value which is sufficient to create a 360 degrees phase shift in phase shifter 36, a linear shift of phase will constantly occur in phase shifter 36 since, electrically, 360 degrees is the same as zero and when the sawtooth starts over, the signal at the output of phase shifter 36 appears to be constantly shifting linearly in phase. Thus, if the frequency of sawtooth generator 38 is 1000 cycles, the two signals arriving at crystal mixer 17 will be 1000 cycles apart, i.e., the received signal will appear to be shifted 1000 cycles/second in frequency. Hence, with no changing phase shift in the received signal at horn 14 from that transmitted there will be a steady state or quiescent signal of 1000 cycles appearing at the output of mixer 17. This is coupled through receiver 39 to terminal 41, as a D.C. voltage reference level. Receiver 39 can be the same as receiver 18, shown and explained more fully with reference to FIG. 2. It can be seen that further phase changes in the received signal caused by ascent or descent of the carrying vehicle will add or subtract from this frequency difference, depending on direction, and of an amplitude depending on speed of ascent or descent. This vertical velocity can be easily determined by suitably calibrated indicating means.

It should be understood of course that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. A movement detector comprising transmitting means, radiating means, first coupling means coupling said transmitting means to said radiating means, said first coupling means including variable phase shifting means for shifting the phase of any signal coupled thereby a pre-determined amount, mixing means, second coupling means coupling said transmitting means to said mixing means, third coupling means coupling said radiating means to said mixing means, receiving means, said receiving means connected to the output of said mixing means and indicating means connected to the output of siad receiving means.

2. The movement detector of claim 1 wherein said receiving means comprises amplifying means connected to the output of said mixing means, clipping means connected to the output of said amplifying means, differentiating means connected to the output of said clipping means, pulse generating means connected to the output of said differentiating means, integrating means connected to the output of said pulse generating means, and indicating means connected to the output of said integrating means.

3. The movement detector of claim 1 wherein said variable phase shifting means comprises a ferrite phase shifter and current generating means connected to said ferrite phase shifter for varying the phase shift.

4. The movement detector of claim 3 wherein said current generating means comprises a sawtooth generator.

References Cited in the file of this patent

UNITED STATES PATENTS 2,524,610   Storm _____ Oct. 3, 1950